(12) United States Patent
Miyata et al.

(10) Patent No.: US 6,631,997 B2
(45) Date of Patent: Oct. 14, 2003

(54) LIGHT-SOURCE DEVICE AND PROJECTION TYPE DISPLAY DEVICE

(75) Inventors: Akihisa Miyata, Tokyo (JP); Shinji Okamori, Tokyo (JP); Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/878,992

(22) Filed: Jun. 13, 2001

(65) Prior Publication Data

US 2002/0036833 A1 Mar. 28, 2002

(30) Foreign Application Priority Data

Jun. 14, 2000 (JP) .......................... 2000-178490
Mar. 23, 2001 (JP) .......................... 2001-085562

(51) Int. Cl.[7] .................. G03B 21/14; G03B 21/22; G03B 21/00
(52) U.S. Cl. .............. 353/97; 353/31; 353/75
(58) Field of Search .................. 353/75, 79, 31, 353/97

(56) References Cited

U.S. PATENT DOCUMENTS

| | | | | |
|---|---|---|---|---|
| 5,634,704 A | * | 6/1997 | Shikama et al. | 353/102 |
| 5,765,934 A | * | 6/1998 | Okamori et al. | 353/38 |
| 6,139,156 A | * | 10/2000 | Okamori et al. | 353/102 |
| 6,322,219 B1 | * | 11/2001 | Okamori et al. | 348/771 |
| 6,377,336 B1 | * | 4/2002 | Shiraishi et al. | 355/53 |
| 2002/0024636 A1 | * | 2/2002 | Okamori et al. | 353/31 |

* cited by examiner

*Primary Examiner*—Russell Adams
*Assistant Examiner*—Andrew Sever
(74) *Attorney, Agent, or Firm*—Birch, Stewart, Kolasch & Birch, LLP

(57) ABSTRACT

A light-source device comprising: a rod integrator having an injection end and an emitting end; a lens unit for collecting a luminous flux emitted from the emitting end; and, a diaphragm. The rod integrator forms a plurality of imaginary light-source points, each of which virtually emits the luminous flux toward the emitting end. The diaphragm is disposed in the vicinity of a plane on which the lens unit forms the images of the imaginary light-source points, and selectively blocks luminous flux emitted from each of the images of the imaginary light-source points.

9 Claims, 10 Drawing Sheets

LIGHT-SOURCE DEVICE AND PROJECTION TYPE DISPLAY DEVICE

BACKGROUND OF THE INVENTION

1. Field of the Invention

The present invention relates to a light-source device for illuminating a light valve means, such as DMD, used in a projection type display device.

2. Description of the Related Art

A Digital Micromirror Device, known as DMD (a trademark of Texas Instruments Incorporated), is widely used in the projection type display device. DMD has an array of micron square movable micromirrors of 16 μm×16 μm fabricated on a silicon substrate. Each micromirror is stable in one of two positions, wherein a source light directed upon the mirror array will be reflected in one of two directions. In one stable "on" mirror position, light will be reflected to a projection lens and focused on the screen. In the other "off" mirror position, light directed on the mirror will be deflected to a light absorber. Each individual micromirror corresponds to one pixel and collectively forms an image by reflecting the light in two directions.

A light-source device for illuminating the light valve as DMD uses a rod integrator to improves the uniformity of the source light (refer to U.S. Pat. No. 5,634,704 for details).

Each micromirror forms "on" and "off" mirror position by tilting at the angles as small as +10° and −10°. Therefor, if the incident light on the DMD has wide angular distribution, each micromirror can not reflect the light in the accurate direction. As a result, the contrast of the projected image decreases.

It is therefor, a primary object of the invention to provide a light-source device, which is capable of providing a source light having uniform brightness of which incident angle has narrow distribution.

SUMMARY OF THE INVENTION

This object is achieved in accordance with one aspect of the present invention which is a light-source device comprising: a rod integrator having an injection end and an emitting end; a lens unit for collecting a luminous flux emitted from the emitting end; and, a diaphragm. The rod integrator forms a plurality of imaginary light-source points, each of which virtually emits the luminous flux toward the emitting end. The diaphragm is disposed in the vicinity of a plane on which the lens unit forms the images of the imaginary light-source points, and selectively blocks luminous flux emitted from each of the images of the imaginary light-source points.

In another aspect of the present invention is A projection type display device comprising: a rod integrator having an injection end and an emitting end; a lens unit for collecting a luminous flux emitted from the emitting end; a diaphragm; a light valve means disposed in the vicinity of the plane on which the lens unit forms an image of the emitting end; and, a projection means. The rod integrator forms a plurality of imaginary light-source points, each of which virtually emits the luminous flux toward the emitting end. The diaphragm is disposed in the vicinity of a plane on which the images of the imaginary light-source points are formed, and selectively blocks luminous flux emitted from each of the images of the imaginary light-source points.

BRIEF DESCRIPTION OF THE DRAWINGS

The invention will become more readily appreciated and understood from the following detailed description of embodiments of the invention when taken in conjunction with the accompanying drawings, in which.

DETAILED DESCRIPTION OF THE INVENTION

Embodiment 1

Figure 1:
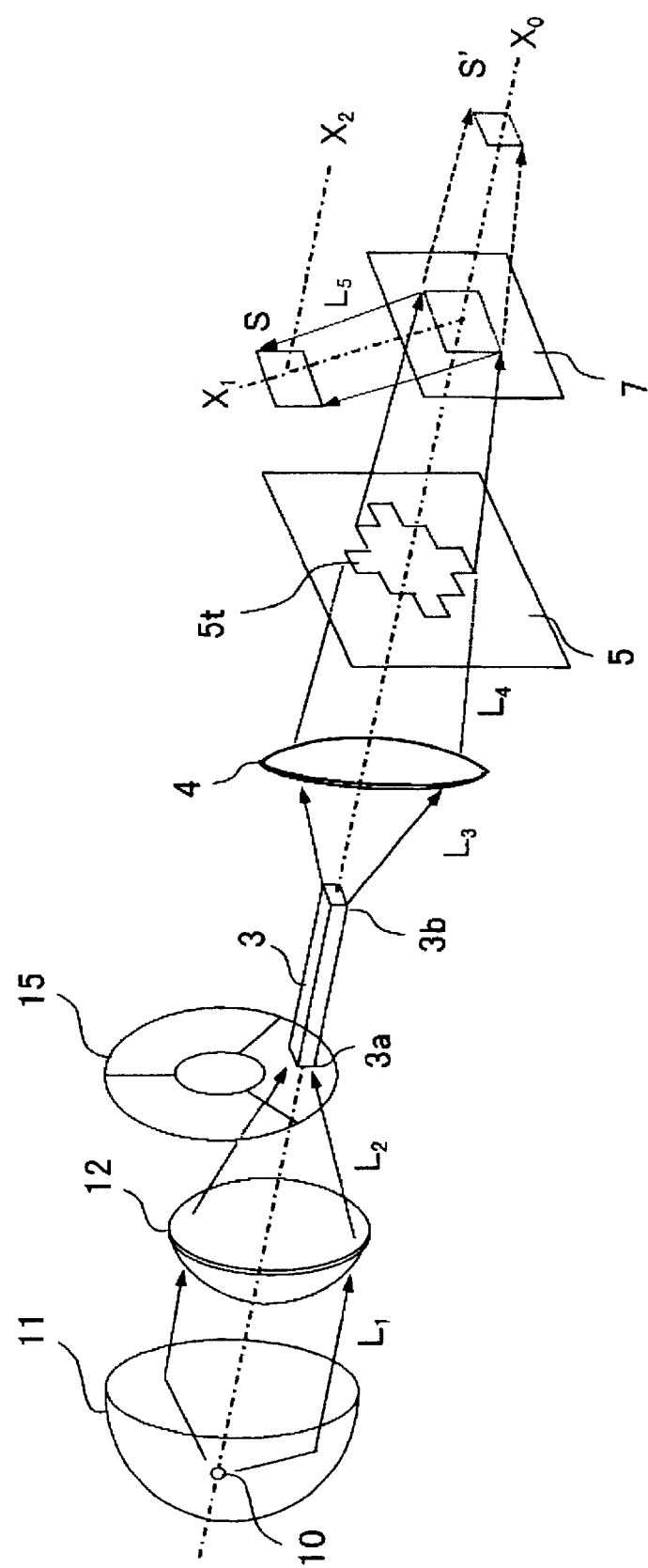
FIG. 1 is a diagram showing the construction of a light-source device according to Embodiment 1.

FIG. 1 is a diagram showing the construction of a light-source device according to one embodiment of the invention. The white luminous flux emitted from a lamp 10 is reflected by an elliptical mirror 11, and is converted into an approximately parallel luminous flux $L_1$. The luminous flux $L_2$ that pass thorough the condenser lens 12 enters color filter 15. The color filter 15 converts the white luminous flux $L_2$ into R G B color light. The luminous flux $L_2$ enters into the rod integrator 3 from an injection end 3a disposed in the vicinity of the convergence point of the luminous flux $L_2$. The rod integrator 3 is a rectangular pillar optical element formed from a glass or plastic material. The luminous flux $L_2$ that enters into the rod integrator 3 reaches an emitting end 3b, being reflected at the inner side surfaces. A luminous flux $L_3$ emitted from the emitting end 3b enters into a condenser lens 4. A luminous flux $L_4$ hat passes through the second condenser lens 4 enters to the diaphragm 5. The diaphragm 5 blocks a part of the luminous flux $L_4$. The luminous flux $L_4$ that passes through an aperture 5t of the diaphragm 5 is reflected in the direction of an optical axis $X_1$ by a mirror 7. The luminous flux $L_5$ reflected by the mirror 7 forms a rectangular image on a plane S, where a light valve means such as a DMD is disposed. The shape of the image formed on the plane S is analogous to the emitting end 3b. A plane S' indicates an image formed by the luminous flux $L_4$ that passes through the aperture 5t, when the mirror 7 was not placed. The image on the plane S' has conjugate relationship with the image formed on the plane S.

Figure 2:
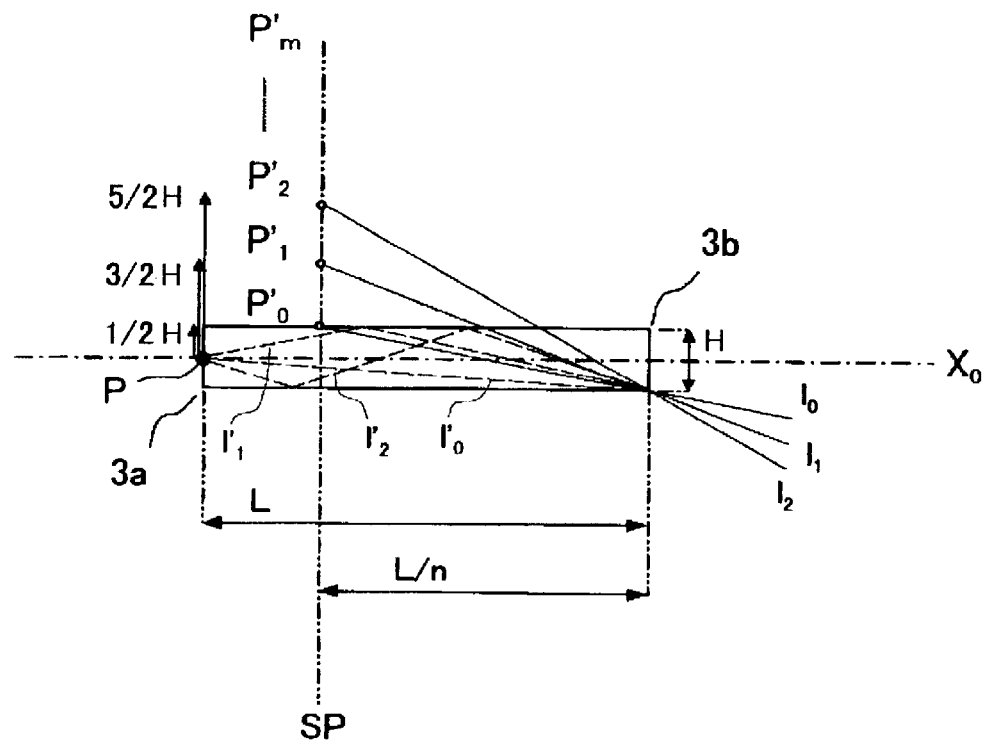
FIG. 2 is an explanatory drawing for the purpose of explaining the functions of a rod integrator.

FIG. 2 is an explanatory drawing for the purpose of explaining the functions of the rod integrator 3. In FIG. 2, the rod integrator 3 has a refractive index of n, a length of L, and cross-sectional height of H. P indicates the convergence point of the luminous flux. The luminous flux that enters into the rod integrator 3 from the injection end 3a reaches the emitting end 3b either being reflected by a predetermined number of times at the inner side surfaces of the rod integrator 3 or without reflection. The luminous flux that is totally reflected from the inner side surfaces illuminates the emitting end 3b, like light rays emitted from imaginary light-source points $P_0'$, $P_1'$ and $P_2'$ formed on a plane L/n distant from the emitting end 3b of the rod integrator 3. Since the emitting end 3b receives total illumination flux emitted by imaginary light-source point, there is good uniformity of illumination within the emitting end 3b. As shown in FIG. 2, the heights of the imaginary light-source points $P_0'$, $P_1'$ and $P_2'$ are given by 1/2H, 3/2H and 5/2H, which increase by a multiple of H (the cross-sectional height of the rod integrator 3) according to the number of the times of reflections.

The emitting end 3b can be regarded as an aperture through which the luminous flux virtually emitted by each of the imaginary light-source points Pm' passes. The luminous flux virtually emitted by each imaginary light-source point Pm' is superimposed at the emitting end 3b, creating a rectangular light image having highly uniform illumination. By the superimposed luminous flux passing through the emitting end 3b, illumination having uniform brightness is obtained on the plane S.

Figure 3:
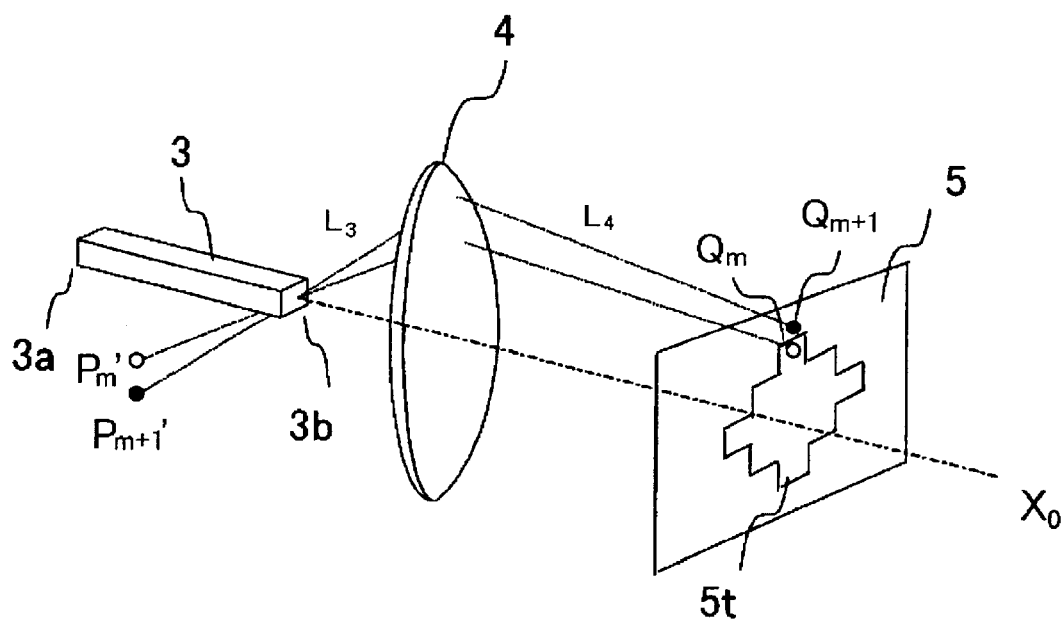
FIG. 3 is a diagram showing the conjugate relationship between imaginary light-source points and second imaginary light-source points as well as the detailed construction of the diaphragm.

The number of imaginary light-source point increases by extending the length of the rod integrator 3. The uniformity of the illumination can be enhanced, as the number of the imaginary light-source point increases. FIG. 3 is the diagram showing a detailed construction of the diaphragm 5. The diaphragm 5 is disposed in a plane where second imaginary light-source points Qm is formed. The second imaginary light-source points Qm are the images of the imaginary light-source points Pm' formed by the condenser lens 4. As shown in FIG. 3, the aperture 5t of the diaphragm 5 is shaped so as to block the second imaginary light-source points emitting undesirable light components.

Figure 4:
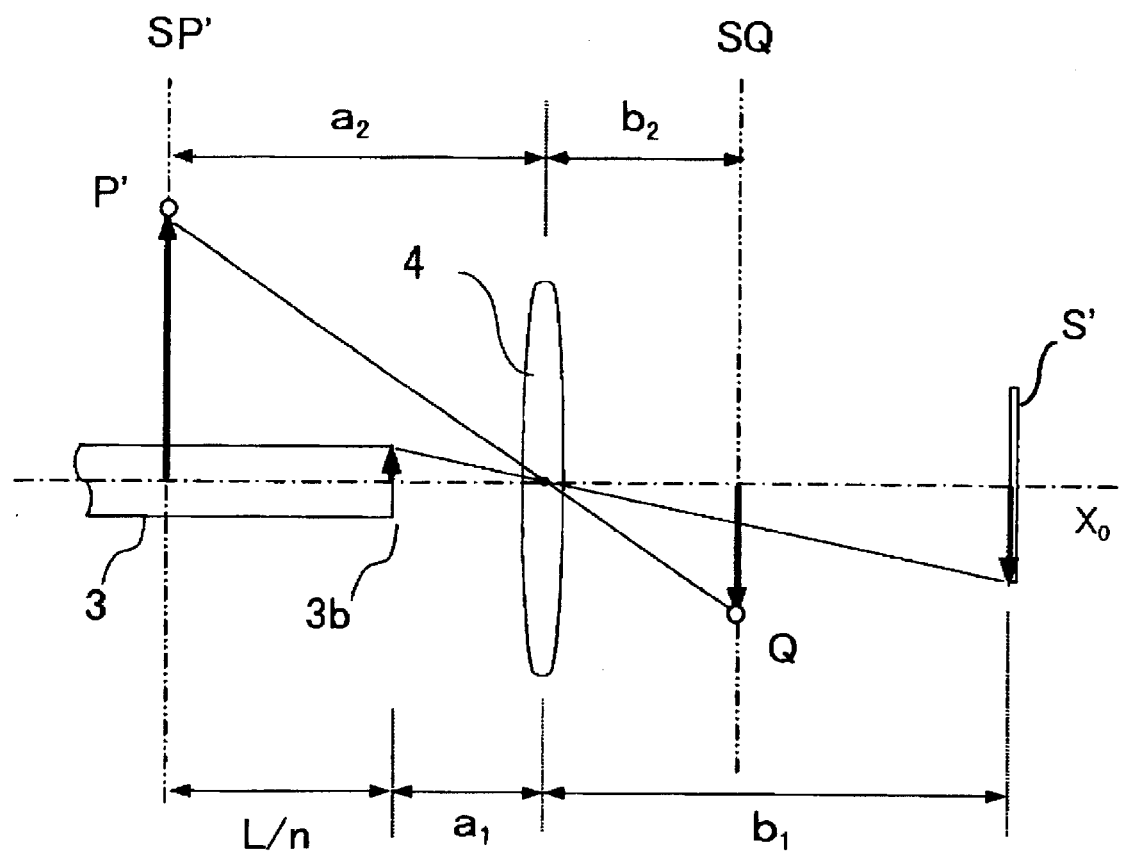
FIG. 4 is a diagram showing the conjugate relationship between imaginary light-source points and second imaginary light-source points.

FIG. 4 is an explanatory drawing for the purpose of explaining the conjugate relationship between the imaginary light-source point P' and the second imaginary light-source point Q. In FIG. 4, SP' indicates a plane on which the imaginary light-source point P' is formed, and SQ indicates a plane on which the second imaginary light-source point is formed. The distances between the condenser lens 4 and the emitting end 3b, the condenser lens 4 and the plane S', the condenser lens 4 and the plane SP', and, the condenser lens 4 and the plane SQ is expressed by $a_1$, $b_1$, $a_2$ and $b_2$, respectively.

Based on the conjugate relationship between P' and Q formed by the condenser lens 4, following equations are obtained by letting the focal length of the condenser lens 4 be f:

$$\frac{1}{a_1} + \frac{1}{b_1} = \frac{1}{f} \quad (1)$$

$$\frac{1}{a_2} + \frac{1}{b_2} = \frac{1}{f} \quad (2)$$

Since the distance between the emitting end 3b and the plane SP' is given by L/n, $a_2$ can be substituted by $L/n+a_1$. Therefor, following equations are derived:

$$a_2 = \frac{L}{n} + a_1 \quad (3)$$

$$b_2 = \frac{a_1 - f}{a_2 f} = \frac{a_1 b_1 \left(a_1 + \frac{L}{n}\right)}{(a_1 + b_1)\left(a_1 + \frac{L}{n}\right) - a_1 b_1} \quad (4)$$

Based on the equations (1)~(4), the position where the diaphragm 5 should be disposed is obtained. For example, when f=37.5 mm, n=1.52, L=60 mm, $a_1$=50 mm, and $b_1$=150 mm, $a_2$ and $b_2$ become $a_2$=89.47 mm and $b_2$ 64.56 mm. In this case, $b_1/a_1$=3, therefor, the size of the rectangular light image formed in the plane S is three times of the emitting end 3b.

Figure 5:
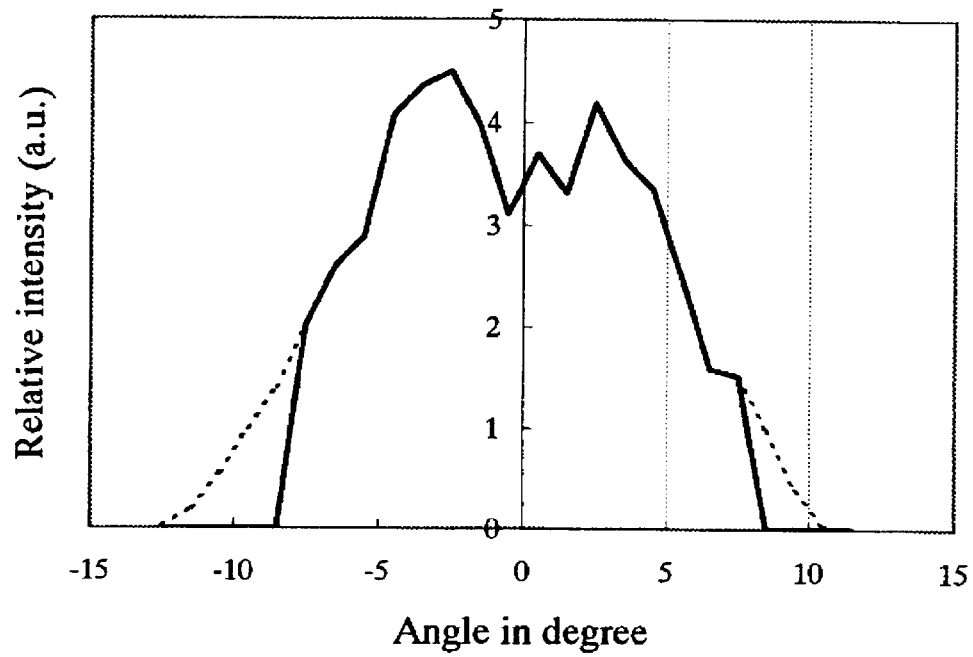
FIG. 5 is a diagram showing the distribution of incident angle of the luminous flux.

FIG. 5 shows the distribution of the incident angle of the luminous flux that passes through the aperture 5 t of the diaphragm 5. In this case, the diaphragm 5 is disposed in the plane SQ, and the aperture 5t is shaped in circle. The rod integrator 3 has a reflective index n of 1.53, a length L of 60 mm, a cross-sectional height H of 3 mm, and cross-sectional width W of 4 mm. Other conditions are following; f=37.5 mm, $b_1$=150 mm, $a_2$=89.47 mm, and $b_2$ 64.56 mm. In FIG. 5, dashed lines represent the angular distributions when the diameter of the aperture 5t is 12.5 m, and solid lines represent that of when the diameter of the aperture 5t is 9 mm. As shown in FIG. 5, the distribution of the incident angle of the light becomes narrower, when the luminous flux is restricted with the diaphragm 5.

Figure 6:
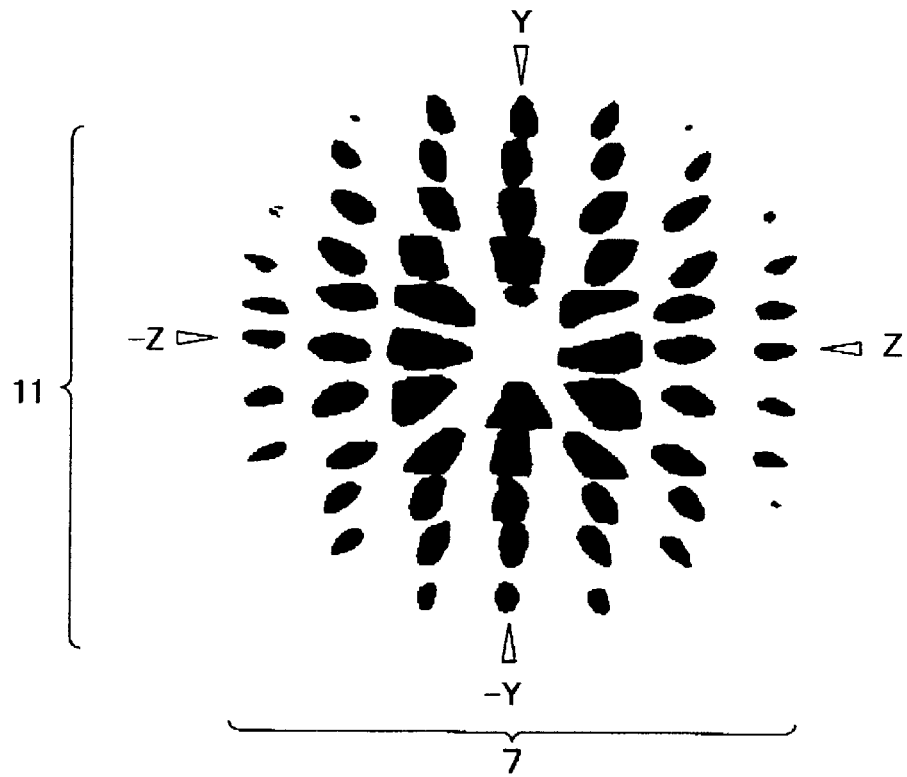
FIG. 6 is a diagram showing the second imaginary light-source points.

FIG. 6 is a diagram schematically showing the distribution of the second imaginary light-source points Q formed on the plane SQ. In this case, the second imaginary light-source points are formed in a matrix of 7×11. Each position of the second imaginary light-source point is given by applying the equation (3) and (4). Taking Y axis in the horizontal direction, and Z axis in the vertical direction, the Y and Z coordinate of the second imaginary light-source point is given by H×k and W×k, where H and W is a cross-sectional height and width of the rod integrator 3, and k=$b_2/a_2$.

Figure 7A:
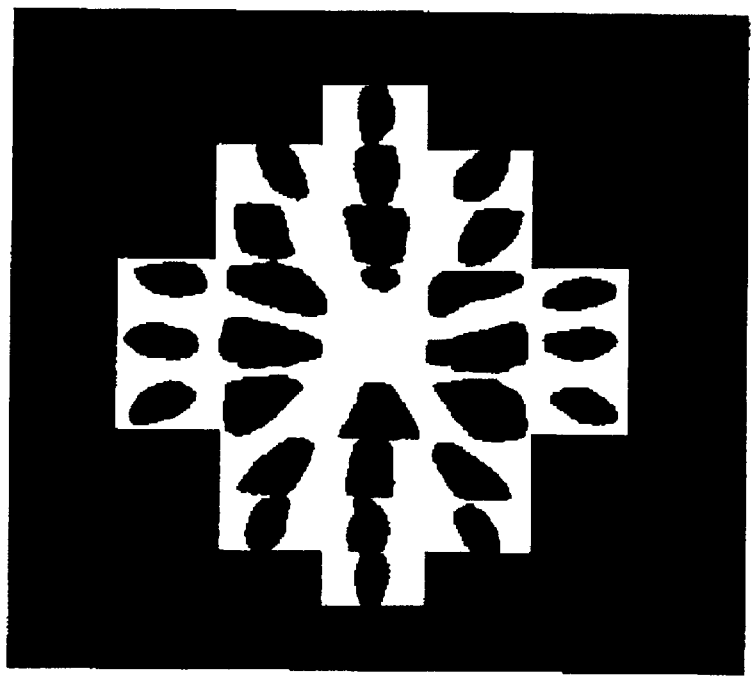
FIGS. 7A and 7B are diagrams showing examples of the shape of the apertures formed in the diaphragms.
Figure 7B:
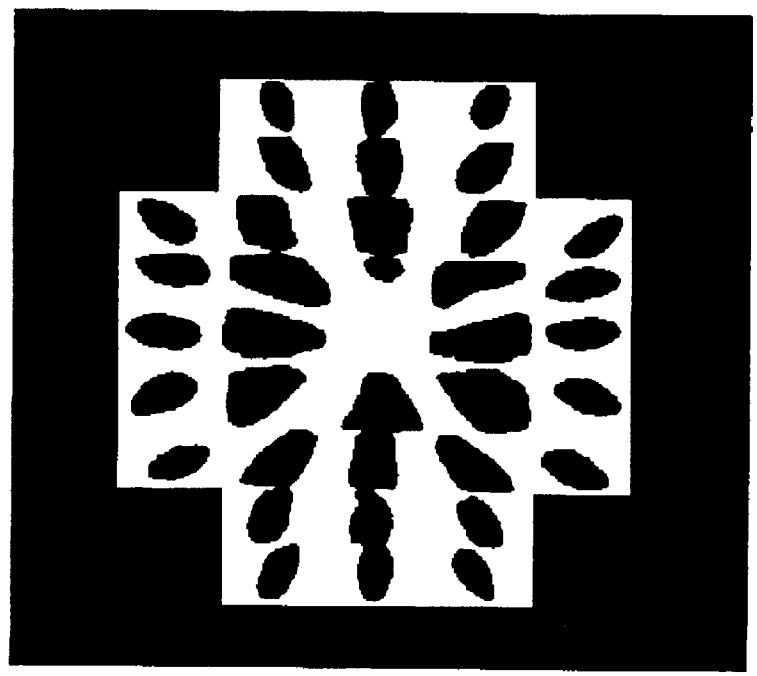

FIGS. 7A and 7B are diagrams showing examples of the aperture 5t of the diaphragm 5. The aperture 5t of the diaphragm 5 is shaped so as to remove the second imaginary light-source points emitting undesirable light component. Which of the second imaginary light-source points should be blocked and the number of them are determined depending on the desired range of incident angles as well as the intensity of the illumination.

Embodiment 2

Figure 8:
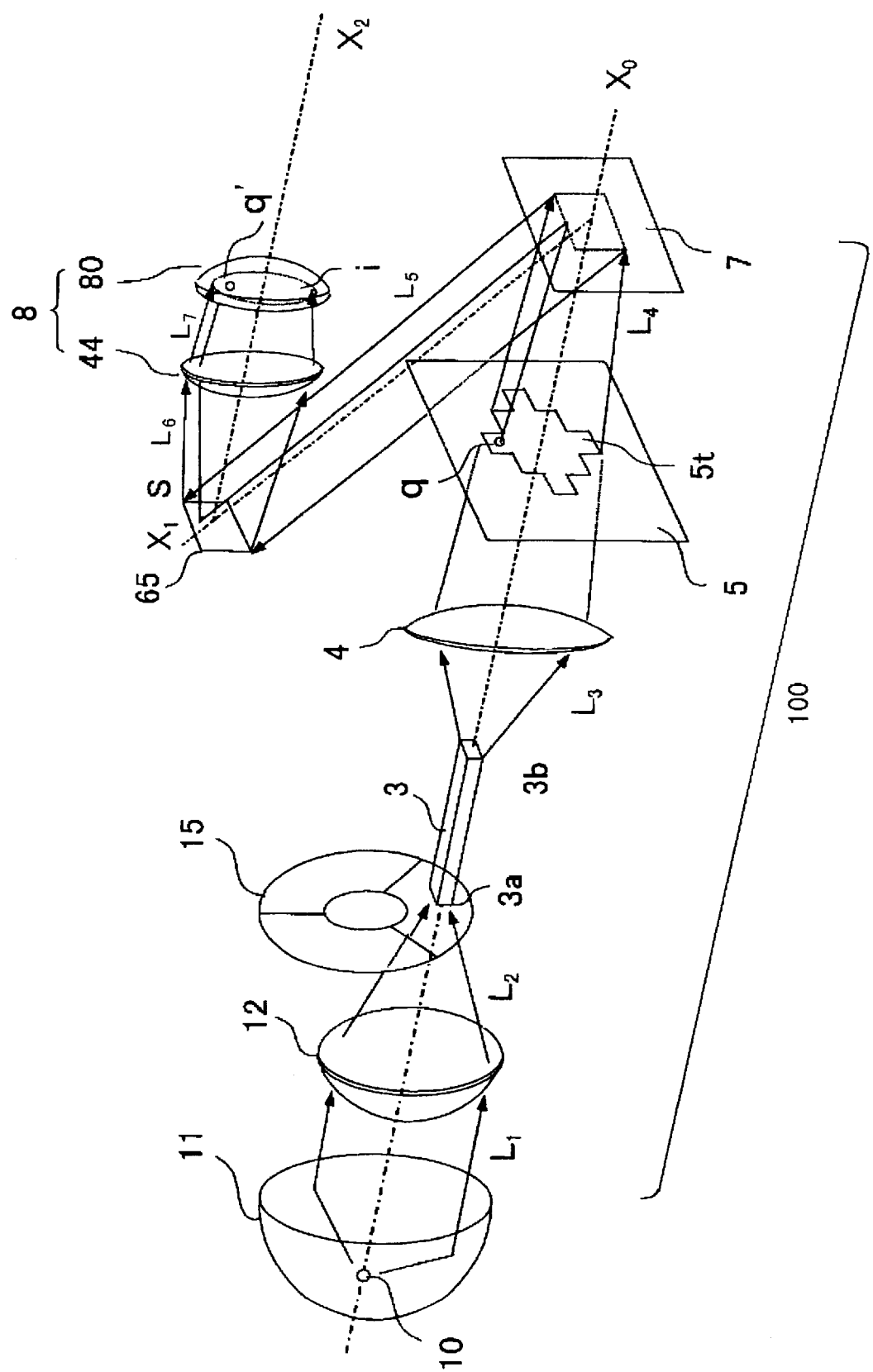
FIG. 8 is a diagram showing the construction of a projection type display device according to Embodiment 2.

FIG. 8 is a diagram showing the construction of a projection type display device utilizing a light-source device according to the Embodiment 1 described above. The light-source device 100 according to the Embodiment 1 illuminates the light valve means 65 disposed in the plane S. An projection lens system 8 comprised of a condenser lens 44 and a projector lens 80 projects an image produced by the light valve means 65 on a screen.

The luminous flux L6 having the light image formed by the light valve means 65 is reflected to the condenser lens 44. The luminous flux $L_7$ that passes through the condenser lens 44 forms third imaginary light-source points q' which are images of the second imaginary light-source points q. The projector lens 80 is disposed so that these third imaginary light-source points Q' are formed on an entrance pupil 80i of the projector lens 80. By forming the third imaginary light-source points Q' on the entrance pupil 80i of the projector lens 80, the optical coupling between the light-source device 100 and the optical projection system 8 are improved.

Furthermore, the projector lens 80 has an enough diameter so that the entrance pupil 80i is able contain all of the third imaginary light-source points.

Embodiment 3

Figure 9:
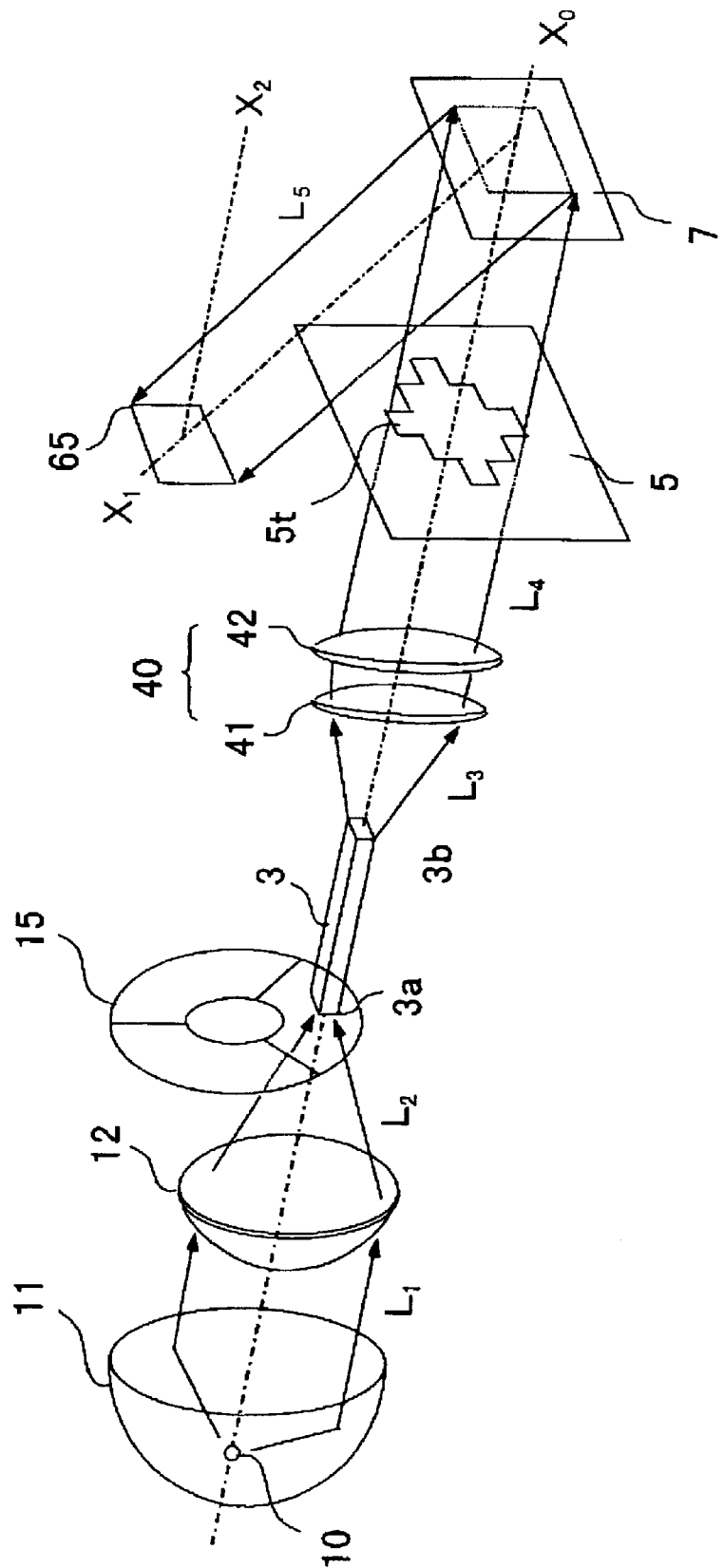
FIG. 9 is a diagram showing the construction of a projection type display device according to Embodiment 3.

FIG. 9 is a diagram showing the construction of a light-source device according to Embodiment 3. An afocal lens system 40 comprised of a first afocal lens 41 and a second afocal lens 42 converts the luminous flux $L_3$ into the parallel luminous flux $L_4$. The diaphragm 5t is disposed in the plane where the second imaginary light-source points are formed. The parallel luminous flux $L_4$ that passes through the aperture 5t illuminates the light valve means 65. The surface of the light valve means 65 is disposed in the plane on which the image at the emitting end 3b is formed by the function of the afocal system 40.

Figure 10:
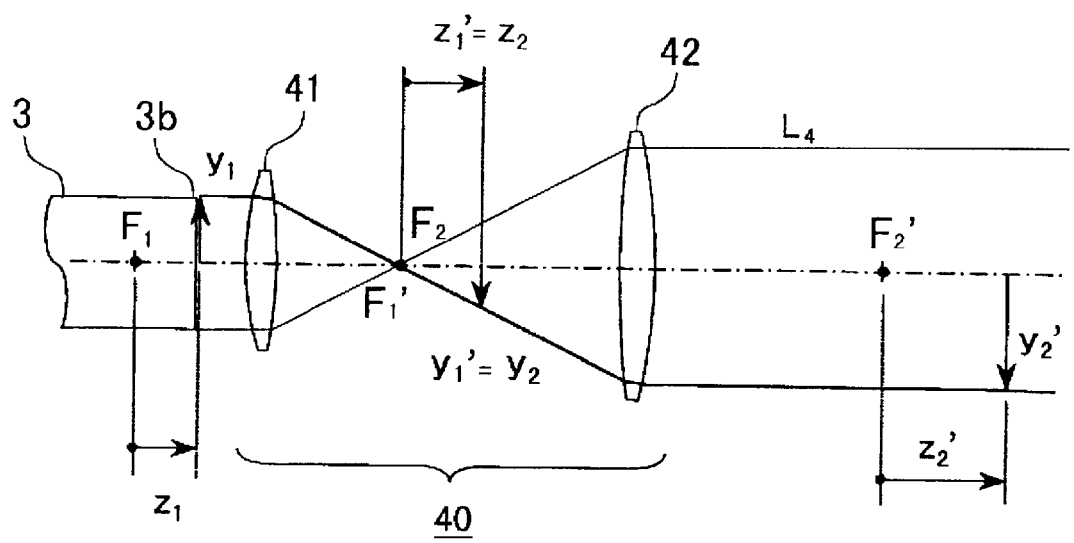
FIG. 10 is a drawing showing the functions of an afocal system.

FIG. 10 is a diagram showing the function the afocal system 40. $F_1$ and $F_1'$ indicate the object-space focal point and the image-space focal point of the first afocal lens 41, respectively. $F_2$ and $F_2'$ indicate the object-space focal point and the image-space focal point of the second afocal lens 42, respectively. The first afocal lens 41 and the second afocal lens 42 are disposed having their image-space focal point $F_1'$ and object-space focal point $F_2$ in the same point. The images indicated by $y_1'$ and $y_2$40 are the conjugate images of $y_1$.

The distances from $F_1$ to the emitting end 3b, $Y_1$ to $F_1$, and $F_2'$ to $y_2'$ are indicated by $Z_1$, $Z_1'$ and $Z_2'$, respectively.

Letting $f_1$ and $f_2$ be the focal length of the first afocal lens 41 and the second afocal lens 42, respectively, $Z_1'$ and $Z_2'$ are given by the following equations:

$$Z_1' = \frac{-f_1^2}{z_1} \quad (5)$$

$$Z_2' = \frac{-f_2^2}{z_2} = \frac{-f_2^2}{z_1'} \quad (6)$$

$$= \left(\frac{f_2}{f_1}\right)^2 z_1 = Mz_1.$$

In the equation (6), $M(=-f_1/f_2)$ represents a magnification.

A lateral magnification $\beta$ is expressed by the following equation:

$$\beta = \frac{f_2}{z_1} \div \frac{f_2}{z_1'} \quad (7)$$

$$= \frac{f_1}{f_2} \times \frac{z_2'}{z_1} = \frac{f_1}{f_2} \times \frac{1}{M^2}$$

$$= \frac{1}{M}.$$

According to these equations, by using afocal lens system 40 and disposing the light valve means 65 in the plane where the image $Y_2'$ is formed, the lateral magnification $\beta$ is determined independently of object position. This construction enables to change the cross-sectional size of the luminous flux $L_4$ or $L_5$ by changing the size of the emitting end 3b of the rod integrator 3 without necessity to adjust the position of the light valve 65.

The construction of the afocal lens system 40 discussed above is a basic example, and in practice, each of the first and second afocal lenses 41 and 42 may be comprised of plural lenses. In this case, the second imaginary light-source points or the third imaginary light-source points are formed in the image-space between the afocal lenses. It is preferable to block the second or third imaginary light-source points formed in the image-space having enough room to dispose the diaphragm 5.

Embodiment 4

Figure 11:
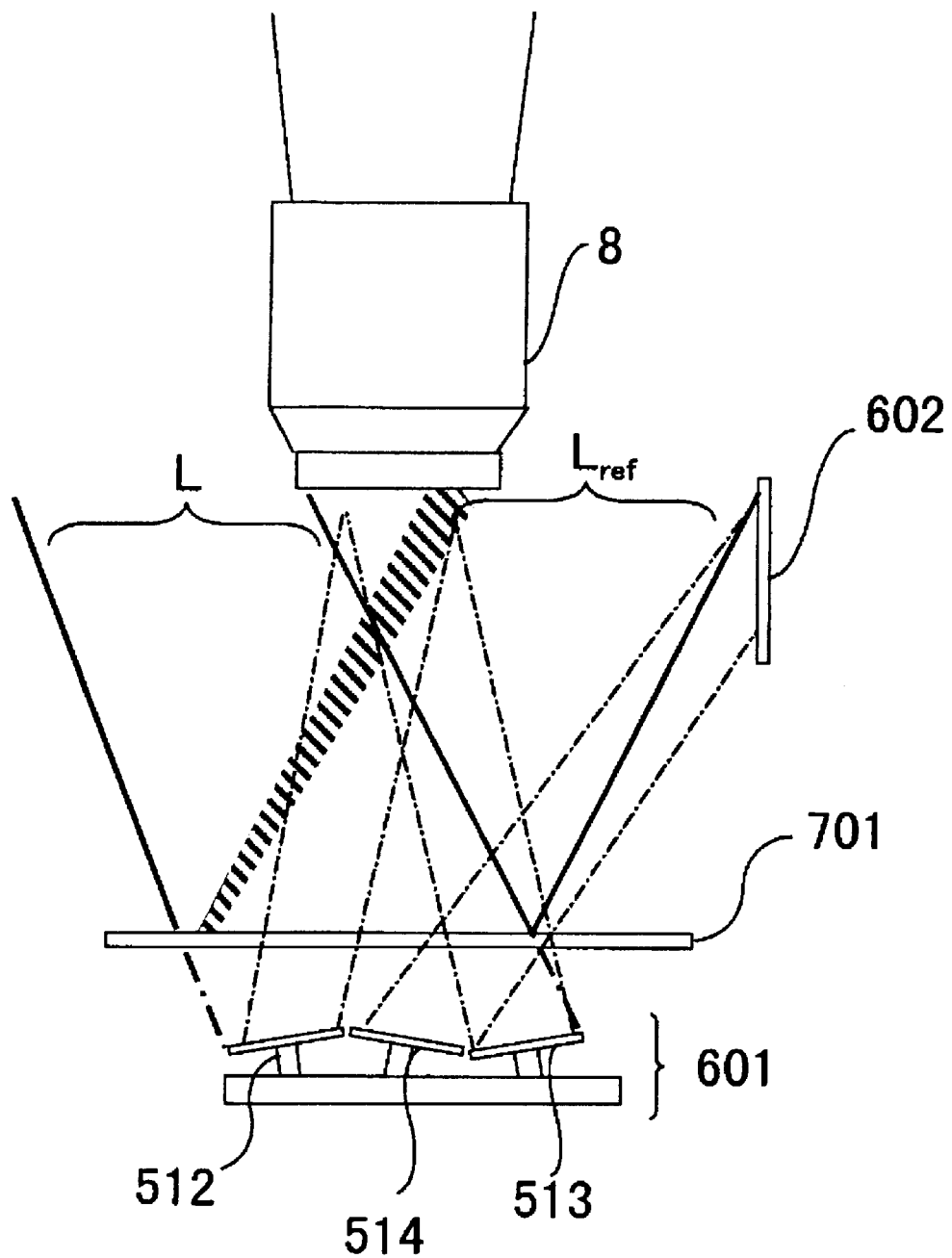
FIG. 11 is a diagram showing the detailed construction of the DMD.

FIG. 11 is a diagram showing the detailed construction of the DMD. Disposed in front of the DMD 601 is a cover glass 701 for protecting micromirrors (only three of them indicated by 512, 513 and 514 are shown in FIG. 11). When the light L illuminate the DMD 601, reflection occurs at the surface of the cover glass 701. At the same time, when each individual micromirrors (512, 513 and 514) reflects light in the direction either to the projection lens system 8 or to the light absorber 602, scattering and diffraction occur. A part of the reflected light $L_{ref}$ produced at the surface of the cover glass 701 and the light caused by the scattering and diffraction enter into the projection lens system 8. The hatched portion in FIG. 11 indicates the component of the reflected light $L_{ref}$ that enters into the projection lens system 8. These lights are projected by the optical projection system 8 and superimposed on the projected image on the screen. This causes the increase of the black level of the projected image increases, and lowers the contrast.

This problem can be solved by use of the diaphragm 5 to block these undesirable light components with the diaphragm 5.

Figure 12:
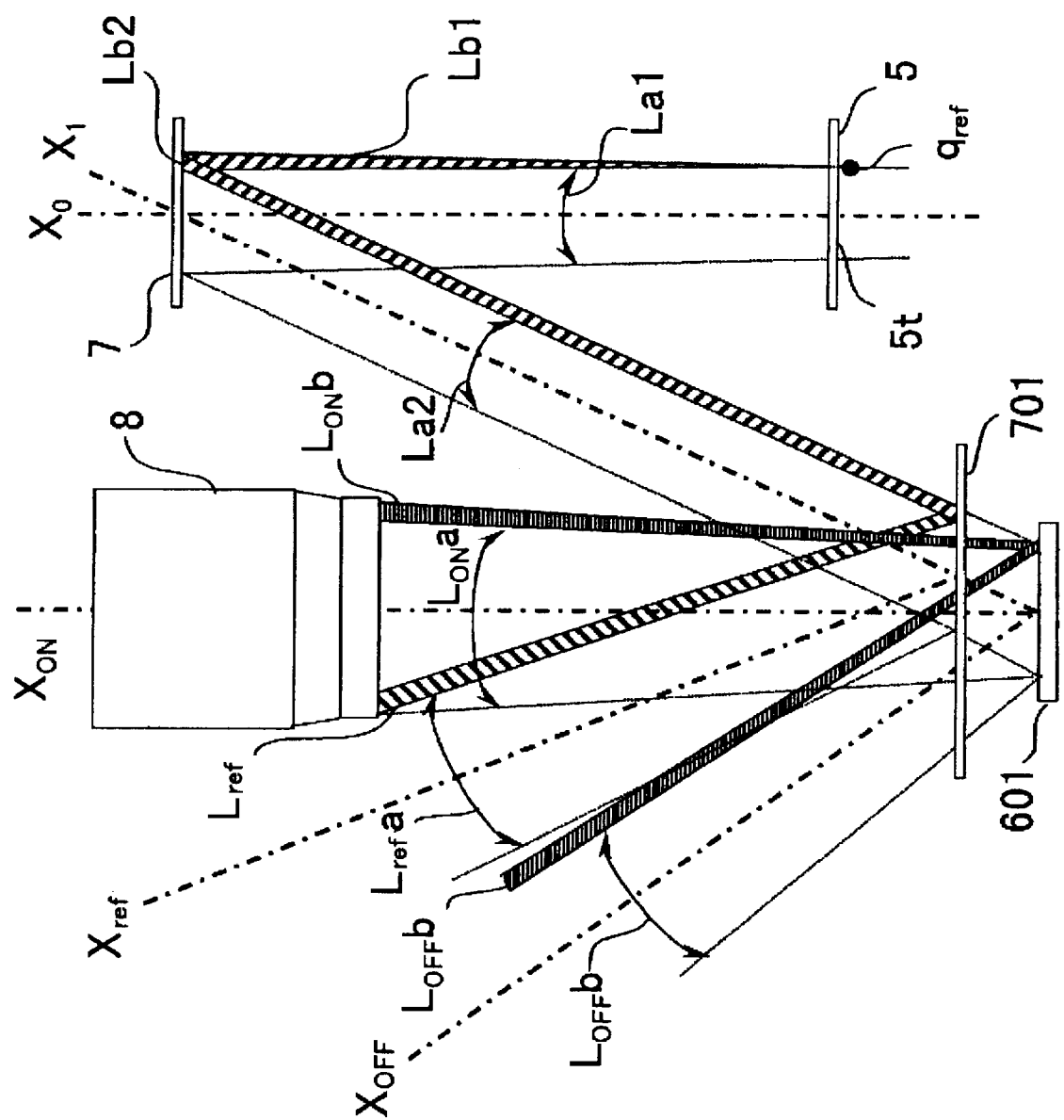
FIG. 12 is an explanatory drawing for the purpose of explaining the construction of diaphragms for blocking undesirable light components.

FIG. 12 is an explanatory drawing for the purpose of explaining a method of blocking such undesirable light components by the diaphragm 5.

The light indicated by La1 that passes through the aperture 5t of the diaphragm 5 is reflected in the direction of the optical axis $X_1$ by the reflecting mirror 7. The reflected light Lb2 is incident on the DMD 601 after passing through the cover glass 701. The light $L_{ON}$a reflected in the direction of an optical axis $X_{ON}$ forms the image of "on pixels". At the same time, the light $L_{OFF}$ deflected in the direction of an optical axis $X_{OFF}$ forms the image of "off pixels". The light $L_{on}$a having the image formed by the DMD 601 is projected onto a screen (not shown) by the projection lens system 8.

In FIG. 12, Lb1, Lb2, $L_{ref}$, $L_{ON}$b, and $L_{OFF}$b indicates the imaginary loci of the undesirable light components blocked by the diaphragm 5. $L_{ref}$ corresponds to the lights produced by reflection at the cover glass 701, and $L_{ON}$b indicates the light produced by the diffraction and scattering by the micromirrors of the DMD 601. As shown in FIG. 12, these lights $L_{ref}$b and $L_{ON}$b are emitted from the second light-source point $q_{ref}$. Therefor, by blocking the second light-source point $q_{ref}$, from which these undesirable light components are emitted, these lights are prevented from entering into the optical projection system 8. The position of the second light-source points $q_{ref}$ that emit undesirable light components are obtained through such method as a reverse ray tracing, and the aperture 5t of the diaphragm 5 should be formed so as to block them.

By blocking these undesirable light components with the diaphragm 5 in the method discussed above, it is possible to obtain the image with higher contrast on the screen.

What is claimed is:

1. A light-source device comprising:

a first lens unit for condensing light emitted by a lamp;

a rod integrator having an injection end and an emitting end, the injection end being disposed in the vicinity of a convergence point of the light condensesd by the first lens, the rod integrator forming a plurality of imaginary light-source points each of which virtually emits the luminous flux to the emitting end a second lens unit for forming the images of the imaginary light source points and a diaphragm being disposed in the vicinity of a plane on which the images of the imaginary light-source points are formed, the diaphragm having an aperture which is shaped so that the diaphragm selectively blocks an image of an imaginary light-source point emitting undesirable light components.

2. A light-source device of claim 1, wherein the second lens unit comprises afocal lens system.

3. A projection type display device comprising a light-source device of claim 1, a light valve means being disposed in the vicinity of a plane on which the second lens unit form an image of the emitting end, and a projection means for projecting an image formed by the light valve means onto a screen.

4. A projection type display device of claim 3, wherein the projection means comprises a condenser lens and a projection lens, the condenser lens which re-forms images of the imaginary light-source points in the vicinity of an entrance pupil of the projection lens.

5. A projection type display device of claim 3, wherein the cross-sectional shape of the emitting end of the rod integrator is analogous to that of the light valve means.

6. A projection type display device comprising:

a first lens unit for condensing light emitted by a lamp;

a rod integrator having an injection end being disposed in the vicinity of a convergence point of the light condensed by the first condenser lens and an emitting end, the rod integrator forming a plurality of imaginary light-source points each of which virtually emits the luminous to the emitting end;

a second lens unit for forming images of the imaginary light-source points;

a diaphragm being disposed in the vicinity of a plane on which the images of the imaginary light-source points are formed, the diaphragm selectively blocks luminous flux emitted from each of the images of the imaginary light-source points;

a light valve means being disposed in the vicinity of a plane on which the second lens unit form an image of the emitting end, the light valve means having a plurality of mirrors forming mirror array each of which reflects light in a first direction or in a second direction, the light valve means which forms images with the light reflected in the first direction; and, a projection means for projecting the images formed by the light valve means onto a screen.

7. A projection type display device of claim 6, wherein the diaphragm blocks a luminous flux to enter into the projection means after being reflected from a cover glass disposed in front of the light valve means.

8. A projection type display device comprising:

a first lens unit for condensing light emitted by a lamp;

a rod integrator having an injection end being disposed in the vicinity of a convergence point of the light condensed by the first condenser lens and an emitting end, the rod integrator forming a plurality of imaginary light-source points each of which virtually emits the luminous to the emitting end;

a second lens unit for forming images of the imaginary light-source points;

a diaphragm being disposed in the vicinity of a plane on which the images of the imaginary light-source points are formed, the diaphragm selectively blocks luminous flux emitted from each of the images of the imaginary light-source points;

a light valve means being disposed in the vicinity of a plane on which the second lens unit form an image of the emitting end, the light valve means having a plurality of mirrors forming mirror array each of which reflects light in a first direction or in a second direction, the light valve means which forms images with the light reflected in the first direction; and, a projection means for projecting the images formed by the light valve means onto a screen, wherein the diaphragm blocks scattered light or diffracted light to enter into the projection means, which is contained in light reflected in the second direction by the light valve means.

9. A light-source device comprising:

a first lens unit for condensing light emitted by a lamp;

a rod integrator having an injection end and an emitting end, the injection end being disposed with no other intervening optical elements in relation to a convergence point of the light condensed by the first lens unit, the rod integrator forming a plurality of imaginary light-source points each of which virtually emits the luminous flux to the emitting end a second lens unit for forming the images of the imaginary light source points and a diaphragm being disposed with no other intervening optical elements in relation to a plane on which the images of the imaginary light-source points are formed, the diaphragm selectively blocks luminous flux emitted from each of the images of the imaginary light-source points.

* * * * *